March 27, 1962     C. D. GRAHAM     3,027,193
HEADREST CUSHION
Filed June 15, 1959
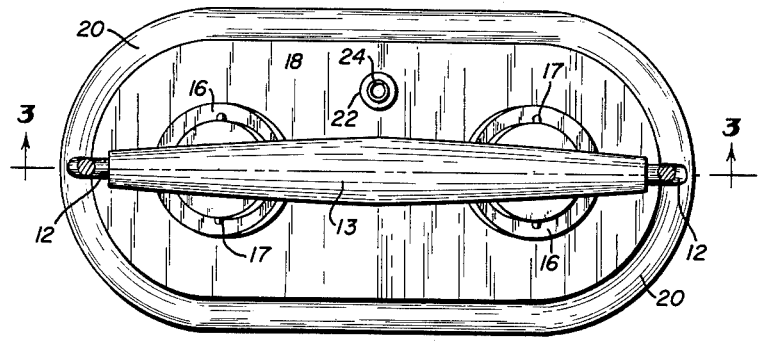
*Fig. 1.*
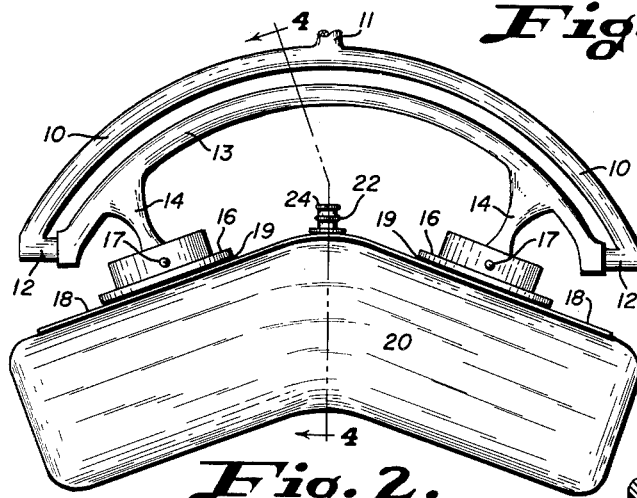
*Fig. 2.*
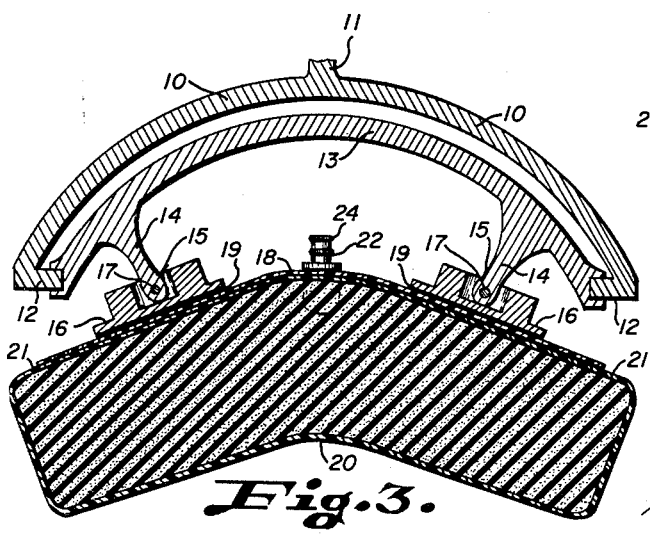
*Fig. 4.*
*Fig. 3.*
INVENTOR.
Charles Dwight Graham
BY
ATTORNEY 3,027,193
HEADREST CUSHION
Charles Dwight Graham, Denver, Colo., assignor to Densco, Incorporated, Denver, Colo., a corporation of Colorado
Filed June 15, 1959, Ser. No. 820,309
5 Claims. (Cl. 297—391)

This invention relates to headrest facilities conventionally associated for expedient adjustment with chairs and analogous equipment adapted to support a person in convenient position for sundry services and attentions, and more particularly to the cushion member customarily associated with such headrest facilities for the direct support of the head of the chair occupant, and has as an object to provide a novel and improved such cushion distinguished by user comfort and convenient adaptability to conforming support of a human head engaged thereagainst.

A further object of the invention is to provide a novel and improved headrest cushion for dental chairs, barber chairs, and the like, that is simple and expedient of operative association with conventional constructions of adjustable headrest facilities.

A further object of the invention is to provide a novel and improved headrest cushion adapted for comfortable, conformable support of the entire human head areas thereto opposed.

A further object of the invention is to provide a novel and improved headrest cushion that is immediately and adjustably amenable to variation of supporting surface contour and applied supporting pressures.

A further object of the invention is to provide a novel and improved headrest cushion that is expedient of production from known and available materials in a wide range of sizes, styles, and finishes.

A further object of the invention is to provide a novel and improved construction and operative correlation of elements constituting a headrest cushion of enhanced user comfort, convenience, and adaptability.

A further object of the invention is to provide a novel and improved headrest cushion that is relatively inexpensive of manufacture, adaptably convenient of installation in diverse positions of use, simple of manipulative adjustment, and positive and efficient in attainment of the ends for which designed.

With the foregoing and other objects in view, my invention consists in the construction, arrangement, and operative combination of elements as hereinafter set forth, pointed out in my claims, and illustrated by the accompanying drawing, in which:

FIGURE 1 is a rear elevation of a typical embodiment of the invention as associated in position of practical use with a conventional adjustable headrest mounting.

FIGURE 2 is a top plan view of the organization according to FIGURE 1.

FIGURE 3 is a section longitudinally through the organization according to the preceding view taken substantially on the indicated line 3—3 of FIGURE 1.

FIGURE 4 is a transverse section through the organization as represented by the preceding views taken substantially on the indicated line 4—4 of FIGURE 2.

Headrest cushions in adjustable association with dental chairs, barber chairs, and analogous equipment, are extensively utilized in a diversity of form and structural particularity somewhat less than fully satisfactory from the viewpoint of user comfort and individual adaptability, hence the instant invention is directed to the provision of a novel and improved such cushion adapted for operative association with the usual diverse conventional headrest mountings as an advantageous substitute or replacement of the functionally less adequate corresponding members hitherto utilized.

Typical of conventional headrest mountings, in and of themselves no part of the instant invention, wherewith the improved headrest cushion is adaptable to practical use, an arcuate yoke 10 is illustrated in symmetrical divergence from a central stem 11 adjustably engageable with a fitting supported on and adjacent the upper end of a chair back section, and as provided with spindles 12 terminating the arms thereof in spaced, inwardly-directed alinement for pivotal engagement within sockets opening outwardly for their reception from ends of a second arcuate yoke 13 thereby supported on the yoke 10 for rotational adjustment relative thereto. Fixed to and inwardly adjacent the ends of the yoke 13, arms 14 similarly extend in radial convergence away from the concave side of said yoke to similarly terminate in eyes 15 receivable in central sockets of attaching plates 16 thereto hingedly engaged by means of pins 17 fixed diametrically of said plates through said eyes. All of the foregoing is but reresentative of conventional headrest mountings associated with a dental chair, or the like, to provide for angular and elevational adjustment of the yoke 10 through the agency of the arm 11, for rotational adjustment of the yoke 13 relative to the yoke 10 through the agency of the spindle and socket interconnection of said yokes, for adjustment of the mounting plates 16 angularly with respect to their supporting arms 14, and for attachment of a cushion, or separate cushions, to the members 16 in position of practical use with relation to the adjustable mounting assembly.

Featuring the improved headrest cushion of the invention is the unitary correlation of all its constituent elements in permanent association with a firm, substantially-rigid, base plate member 18 appropriate for attachment to the conventional mounting members 16 in whatever manner the nature and construction of the conventional members 16 may indicate to be appropriate. In any suitable material, such as certain of the so-called plastics, the plate 18 is an initially-flat, thin, rectangular unit of desired size and proportions bent through a smooth curve at its transverse median zone to the form of a widely-open V in edge elevation, whereby to adapt said plate 18 for engagement against exposed surface areas of the mounting plates 16 in substantially perpendicular relation with the arms 14 respectively mounting said plates 16. Symmetrically correlated with the elements of the conventional headrest mounting assembly and in surface engagement of its angularly related areas against the exposed flat areas of the plates 16, the plate 18 is secured in its position of practical use by any means appropriate to effect its attachment to the plates 16, a layer of adhesive, indicated at 19, having been found to be entirely practical for effecting such attachment to conventional plates 16 of common type and construction, while the alternative use of screws engaged through plates 16 apertured for their accommodation to penetration within the plate 18 has been found to be equally practical to effect desired mounting of the plate 18 in operative association with conventional facilities amenable thereto.

The plate 18 fixedly mounts and supports an envelope 20 of flexible, air-impermeable material in closing relation over and in extension away from its angularly-recessed surface, which envelope, in a length somewhat exceeding that of the plate, a width somewhat exceeding that of said plate, and a substantial depth, or dimension perpendicular to the plate 18, effective to space the overlying area of the envelope from, and to yield toward, said plate, is sealed to said plate in either marginally-overlapping or completely-covering relation with the plate surface thereby engaged, and is itself completely closed and sealed against ingress or egress of air, save as hereinafter specified, in a slightly detailed conformation preferably exhibiting rounded corners and edges.

The envelope 20 confines, and is normally fully distended by, a filler unit 21 of highly-resilient material, such as sponge or foam rubber, interiorly conformable to the envelope and characterized by intercommunicating air passages and interstices normally expanded by the resilience of the material for accommodation therein of a volume of air at atmospheric pressure large in proportion to the size of the filler and the volumetric capacity of the envelope. Confined within the closed, air-impermeable envelope 20 as shown and described, the filler 21 distends the envelope to present the surface thereof remote from the plate 18 as a smooth, cushioned area adjustable in its mounting to receive and support the head of a user with moderate, conforming yieldability less than that of the filler material itself determined by the air content of the filler when escape of air from the interior of the envelope is inhibited, in which condition of air entrapment the headrest cushion unit of the invention functions in close analogy with conventional similar equipment from which it differs but in those obvious respects ascribable to the materials and structural correlations utilized.

Distinctively qualifying the cushion unit organized as hereinabove set forth for realization of the concept and advantages of the invention, provision is made for selective regulation of air transfer outwardly from and inwardly to the interior of the envelope 20, whereby to control and to adjust the load resistance, load-sustaining conformation, and load-supporting pressure of the unit. Manifestly, with a passage open to atmosphere from the interior of the envelope 20, the face area of the envelope remote from the plate 18 and the filler 21 normally distending the same will conformably yield to loads applied to said face area with a resistance supplied solely by the resilience of the filler material, and said filler will react by virtue of its resilience to expand and distend the envelope with air intake through such passage when there is no load applied to the said face area, any condition of partial compression of the filler with corresponding expulsion of air therefrom being susceptible of retention through closing of the passage accommodating air transfer to and from the interior of the unit. Hence, as a feature of the invention, a selectively-regulatable air flow passage typified by a manually-actuable valve 22 is provided in any position of convenient access through the plate 18 and the possibly corresponding zone of the envelope 20 in communication between the envelope interior and atmosphere, and said valve 22 is organized, in any appropriate structural particularity, for convenient manipulation applied therethrough to close, or to open, said passage. In a typical construction practical for convenient use in attainment of its purposes, the valve 22 is represented as comprising an internally-threaded sleeve 23 sealed perpendicularly through the plate 18 to dispose a radially-inward shoulder 23' on its inner end interiorly of the envelope 20 and filler 21, a tubular plug 24 formed with one open and one closed end threadedly engaged within the sleeve 23 to oppose its closed end and a sealing gasket 25 thereon to said shoulder 23' with a clearance between the closed end portion of said plug and the circumjacent wall of the sleeve, and an aperture 26 intersecting the wall of said plug inwardly adjacent the closed end thereof, whereby rotation of the plug in one direction advances the gasket 25 thereon to sealing coaction with the shoulder 23' for consequent closing of the outflow passage from the interior of the unit and rotation of said plug in the opposite direction retracts the gasket 25 from its seat against the shoulder 23' to establish an open flow passage through the shouldered inner end of the sleeve 23, exteriorly about the closed end of the plug 24 and its gasket 25, and thence inwardly of said plug through the aperture 26 in communication with atmosphere by way of the tubular portion of the plug opening through the exterior end thereof. Organized substantially as shown and described, the valve 22 is selectively manipulable to open and to alternatively close the sole passage for transfer of air to and from the interior of the envelope 20, whereby to regulate and to determine reaction of the cushion to loads acting against the angularly-recessed face area thereof; it being readily apparent that with the air flow passage open through the valve 22 and no load acting upon the cushion the envelope 20 is fully distended by the resilience of the filler 21 for yieldable conformity to imposed load with but that resistance supplied by the filler as the air content of the envelope escapes through the valve, that with the envelope fully distended and the air flow passage closed at the valve 22 the resistance of the cushion unit to imposed load is the resilience of the filler augmented by the compression factor of the consequently-entrapped air, and that closing of the valve for interruption of air escape therethrough at any stage of cushion deformation under load operates to determine and to maintain the load-conforming condition of cushion yieldability then obtaining.

By reason of its comfortable cushioning properties, its regulable load-conformable adaptability, its facility and convenience of selective control, and its wide applicability to practical use association with conventional mountings, the cushion of the invention is distinctively meritorious as a uniquely advantageous improvement over the hitherto-known analogous equipment which it is designed to replace.

Since changes, variations, and modifications in the form, construction, and arrangement of the elements shown and described may be had without departing from the spirit of my invention, I wish to be understood as being limited solely by the scope of the appended claims, rather than by any details of the illustrative showing and foregoing description.

I claim as my invention:

1. A head rest adapted to be coupled to conventional headrest supports for a dental chair or the like, comprising, in combination, a generally rectangular plate bent to form a spread V-shape member having inside faces disposed at an angle of less than 180° with respect to one another, means defining a flexible, at least substantially air-impermeable envelope, said envelope covering said inside faces of said spread V-shape member, a resilient yieldable filler member carried within said envelope and filling the same, said filler member urging said envelope to a position with the forward faces of said envelope extending in spaced parallel relation directly forward of said inside faces of said spread V-shape member, and a valve carried by said spread V-shape member, said valve communicating the inside of said envelope with the atmosphere, said valve member having an adjustable manipulatable valve element projecting rearwardly of said spread V-shape member for permitting selective opening and closing of said valve.

2. A head rest as defined in claim 1 wherein said spread V-shape member is air-impermeable and is marginally sealed with said means defining a flexible envelope to provide an air-impermeable chamber housing said filler member.

3. A head rest as defined in claim 1 wherein said envelope overlaps and extends outwardly beyond the peripheral edges of said spread V-shape member in circumscribing relation therewith.

4. A head rest as defined in claim 1 wherein said filler member is a readily-compressible, homogeneous body pervious to air.

5. A head rest as defined in claim 1 wherein said spread V-shape member is air-impermeable and is marginally sealed with said means defining a flexible envelope to provide an air-impermeable chamber housing said filler member; wherein said envelope overlaps and extends outwardly beyond the peripheral edges of said spread V-shape member in circumscribing relation therewith; and wherein said filler member is a readily-compressible homogeneous body pervious to air.

References Cited in the file of this patent

UNITED STATES PATENTS

| | | |
|---|---|---|
| 1,401,406 | Hollis | Dec. 27, 1921 |
| 1,940,361 | May | Dec. 19, 1933 |
| 2,545,313 | Sawyer | Mar. 13, 1951 |
| 2,667,915 | Pfeffer | Feb. 2, 1954 |
| 2,803,023 | Rosenberg et al. | Aug. 20, 1957 |
| 2,838,099 | Warner | June 10, 1958 |